(12) United States Patent
Ota

(10) Patent No.: US 8,709,106 B2
(45) Date of Patent: Apr. 29, 2014

(54) LITHIUM SECONDARY BATTERY ANODE MEMBER AND METHOD FOR MANUFACTURING THE SAME

(75) Inventor: Nobuhiro Ota, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1924 days.

(21) Appl. No.: 11/476,126

(22) Filed: Jun. 28, 2006

(65) Prior Publication Data

US 2006/0292449 A1    Dec. 28, 2006

(30) Foreign Application Priority Data

Jun. 28, 2005 (JP) .................. 2005/188945

(51) Int. Cl.

| | |
|---|---|
| *H01M 4/1395* | (2010.01) |
| *H01M 10/0562* | (2010.01) |
| *H01M 4/58* | (2010.01) |
| *H01M 4/134* | (2010.01) |
| *H01M 10/058* | (2010.01) |
| *H01M 4/38* | (2006.01) |

(52) U.S. Cl.
CPC .......... *H01M 4/1395* (2013.01); *H01M 4/134* (2013.01); *H01M 10/0562* (2013.01); *H01M 10/058* (2013.01); *H01M 4/382* (2013.01); *H01M 2300/0071* (2013.01)
USPC .................. 29/623.5; 429/322; 429/231.95; 427/58

(58) Field of Classification Search
CPC ... H01M 4/134; H01M 4/1395; H01M 4/366; H01M 4/382; H01M 4/4054; H01M 4/523; H01M 10/0525; H01M 10/0562; H01M 2300/0071
USPC ............. 429/218.1, 231.95, 322; 29/623.5; 427/58, 402, 405
See application file for complete search history.

(56) References Cited

U.S. PATENT DOCUMENTS

| | | | |
|---|---|---|---|
| 5,217,826 A | 6/1993 | Yamamura et al. | |
| 6,365,300 B1 | 4/2002 | Ota et al. | |
| 6,821,675 B1 | 11/2004 | Morigaki et al. | |
| 7,416,815 B2 * | 8/2008 | Ota et al. ............. | 429/231.95 |
| 2004/0005504 A1 * | 1/2004 | Kugai et al. .......... | 429/322 |
| 2006/0127772 A1 | 6/2006 | Ota et al. | |

FOREIGN PATENT DOCUMENTS

| | | |
|---|---|---|
| EP | 0 469 574 A1 | 2/1992 |
| EP | 1 052 718 A1 | 11/2000 |
| EP | 1 365 470 A1 | 11/2003 |
| JP | 04202024 | 7/1992 |
| JP | 05306117 | 11/1993 |
| JP | 05306118 | 11/1993 |
| JP | 05306119 | 11/1993 |
| JP | 05310417 | 11/1993 |
| JP | 05310418 | 11/1993 |
| JP | 06279049 | 10/1994 |
| JP | 06340446 | 12/1994 |
| JP | 2002-184455 A | 6/2002 |
| JP | 2002-329524 | 11/2002 |
| JP | 3407733 | 3/2003 |
| JP | 2004-220906 | 8/2004 |
| JP | 2004-220906 A | 8/2004 |
| JP | 2004220906 A * | 8/2004 ............ H01M 10/36 |

OTHER PUBLICATIONS

Masahiro Murayama, et al., "Material design of new lithium ionic conductor, thio-LISICON, in the $Li_2S$—$P_2S_6$ system," Solid State Ionics, 2004, pp. 173-180, vol. 170, Elsevier, B.V.
European Search Report issued in corresponding European Patent Application No. EP 06 25 3315, dated Oct. 12, 2006.
Takada, et al., "Lithium ion conductive oxysulfide, $Li_3PO_4$-$Li_3PS_4$," Solid States Ionics, Oct. 2005, pp. 2355-2359, vol. 176, No. 31-34, North Holland Pub. Company, Amsterdam, NL.
Japanese Office Action, with English Translation, issued in Japanese Patent Application No. JP 2005-188945, mailed on Mar. 7, 2008.

* cited by examiner

*Primary Examiner* — Edu E Enin-Okut

(74) *Attorney, Agent, or Firm* — McDermott Will & Emery LLP

(57) ABSTRACT

A lithium secondary battery anode member of the present invention includes a solid electrolyte film formed on a lithium metal film and is capable of suppressing reduction of the solid electrolyte film over a long period of time. In the lithium secondary battery anode member, the lithium metal film and the solid electrolyte film are laminated on a substrate, the solid electrolyte film contains the composition $xLi.yP.zS.wO$ wherein x, y, z, and w satisfy the relations, $0.2 \leq x \leq 0.45$, $0.1 \leq y \leq 0.2$, $0.35 \leq z \leq 0.6$, and $0.03 \leq w \leq 0.13$, respectively, $(x+y+z+w=1)$, and the main peaks of an X-ray diffraction pattern of the solid electrolyte film measured by a film method using Cu Kα radiation are at 2θ of about 11° and 30° and each have a half width of 10° or less.

2 Claims, 1 Drawing Sheet

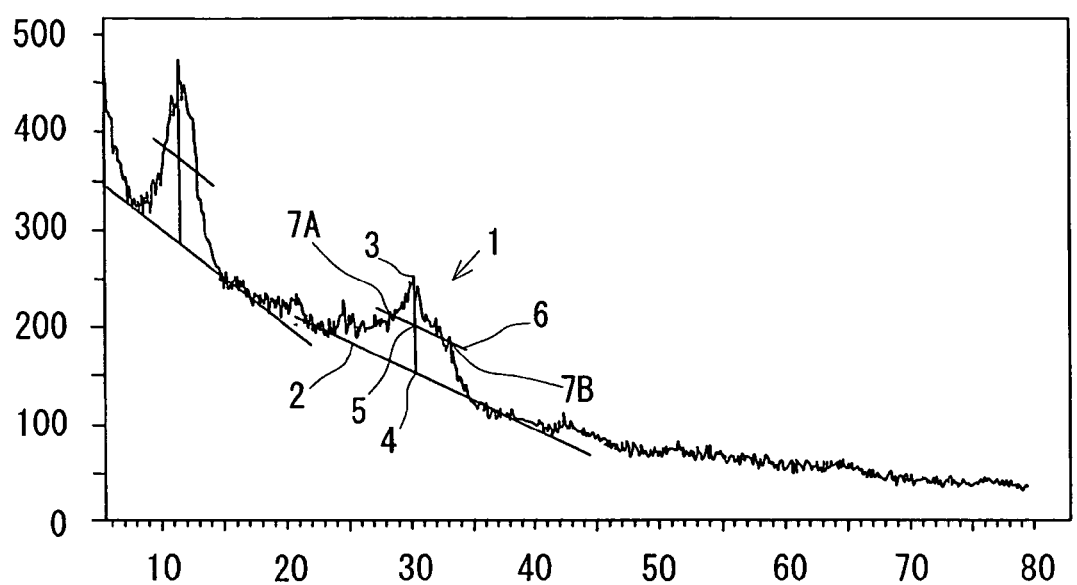

LITHIUM SECONDARY BATTERY ANODE MEMBER AND METHOD FOR MANUFACTURING THE SAME

BACKGROUND OF THE INVENTION

1. Field of the Invention

The present invention relates to a lithium secondary battery anode member for realizing high capacity and high safety, and a method for manufacturing the same.

2. Description of the Background Art

Highly integrated, high-performance devices such as large-scale integrated circuits have been recently put into practical use due to significant development in microelectronics, particularly technology for manufacturing semiconductor devices. By using such integrated high-performance devices in control systems of various apparatuses, these apparatuses can be rapidly decreased in size, thereby contributing to miniaturization and multifunctionalization not only in various industrial fields but also in the field of general home electric appliances.

These electronic devices are generally made cordless, i.e., they include self-sustained power supplies and tend to become operable without relying on commercial power supplies. As a power supply, a primary or secondary battery is generally used. In order to decrease the overall size and weight of an apparatus and permit the operation of the apparatus for a long period of time, development of a high-performance battery is required.

In particular, in order to realize a small lightweight battery, a lithium battery using lithium in oxidation-reduction reaction is suitable. As a lithium battery, development of a secondary battery which can be repeatedly used many times by electric charging is demanded.

In particular, various attempts have been made to improve the performance of solid electrolytes used for lithium batteries. For example, Japanese Unexamined Patent Application Publication No. 2004-220906 discloses a technique in which a lithium secondary battery anode member is formed by laminating a lithium metal film and a solid electrolyte film on a substrate, and the solid electrolyte includes lithium, phosphorus, sulfur, and oxygen as main components.

Japanese Patent No. 3407733 discloses a technique in which a solid electrolyte film containing lithium and sulfur as essential components, an element selected from phosphorus, silicon, boron, germanium, and gallium, and sulfur is heated to a temperature of 40° C. to 200° C. to increase the ionic conductivity.

Other inorganic solid electrolytes having lithium ionic conductivity and including lithium, phosphorus, and sulfur are disclosed in Solid State Ionics, 170 (2004), pp. 173-180. The X-ray diffraction patterns of the resulting inorganic solid electrolytes are shown in FIG. 2 on page 176 of the document.

Solid electrolytes used for lithium secondary batteries are required to have characteristics, such as high lithium ionic conductivity, low electronic conductivity, and satisfactory voltage resistance. Furthermore, in relation to the formation on lithium metal, the solid electrolytes are required to have stability against lithium metal, adhesiveness at interfaces between solid electrolyte films and lithium metal, and stability against organic electrolytic solutions. In particular, when a solid electrolyte is used as a protective film for a lithium metal surface, it is necessary for the solid electrolyte not to react with lithium metal, and it is important for the solid electrolyte not to be decomposed by reduction with lithium metal.

In particular, it is important that the solid electrolyte is stable against the reducing property of an anode active material such as lithium metal or the like, reductive decomposition little occurs, and electronic conductivity is low or not increased. From the viewpoint of these requirements, the solid electrolyte film disclosed in Japanese Unexamined Patent Application Publication No. 2004-220906 contains oxygen and can inhibit short-circuit due to the occurrence of dendrite from a lithium metal anode. However, long-term durability against reaction between solid electrolytes and lithium metal has been not elucidated.

SUMMARY OF THE INVENTION

The present invention has been achieved in consideration of the above-described situation, and it is an object of the present invention to provide a lithium secondary battery anode member unreactive to lithium metal, and a method for manufacturing the same.

The present invention provides a lithium secondary battery anode member including a solid electrolyte film which is neither amorphous nor crystalline and which has middle crystallinity between amorphous and crystalline states.

The lithium secondary battery anode member of the present invention includes a lithium metal film and a solid electrolyte film which are laminated on a substrate, wherein the solid electrolyte film contains the composition $xLi.yP.zS.wO$ wherein $x$, $y$, $z$, and $w$ satisfy the relations, $0.2 \leq x \leq 0.45$, $0.1 \leq y \leq 0.2$, $0.35 \leq z \leq 0.6$, and $0.03 \leq w \leq 0.13$, respectively, $(x+y+z+w=1)$, and the main peaks of an X-ray diffraction pattern of the solid electrolyte film measured by a thin film method using Cu Kα radiation are at $2\theta$ of about 11° and 30° and each have a half width of 10° or less.

The solid electrolyte film of the present invention is composed of the elements of lithium, phosphorus, sulfur, and oxygen, but these elements do not form a compound. Therefore, the expression $xLi.yP.zS.wO$ is used. When the peaks at $2\theta$ of about 11° and 30° in the X-ray diffraction pattern each have a half width of 10° or less, the solid electrolyte film has a weak crystal structure. The peak positions slightly vary according to compositions.

The X-ray diffraction pattern of the weak crystalline solid electrolyte film is characterized by the slightly broad peaks at $2\theta$ of 11° and 30° as centers each having a half width of 10° or less. Although a film formed by usual deposition has a half width exceeding 10°, the solid electrolyte film of the present invention has a half width of 10° or less due to heating. It was found that when a solid electrolyte film has a weak crystal structure between a crystal structure and an amorphous structure, oxygen and sulfur can be mixed, and as a result, a solid electrolyte film more stable to Li metal can be obtained.

Even if a crystalline compound composed of lithium, phosphorus, sulfur, and oxygen is formed in the solid electrolyte film of the present invention, the amount of the crystal compound formed is so small that it cannot be detected by an X-ray diffraction pattern. Crystallization of a solid electrolyte film composed of lithium, phosphorus, sulfur, and oxygen by heating produces a mixture of a crystalline compound composed of lithium, phosphorus, and sulfur, and a crystalline compound composed of lithium, phosphorus, and oxygen. In this case, a solid electrolyte phase not containing oxygen is precipitated, thereby failing to obtain a reduction resistance effect.

The lithium metal film of the present invention preferably contains 1 atomic % to 10 atomic % of oxygen. In the lithium film containing an appropriate amount of oxygen, the lithium metal has the decreased power of reducing the solid electrolyte film and thus has the function to indirectly increase the reduction resistance of the solid electrolyte film.

A method for producing a lithium secondary battery anode member of the present invention includes laminating a lithium metal film and a solid electrolyte film on a substrate as follows: A lithium metal film is deposited on a substrate, and then a solid electrolyte film is deposited on the lithium metal film and then heated at 75° C. to 170° C. for 5 minutes to 50 hours in a dry inert atmosphere. The composition of the solid electrolyte film is xLi.yP.zS.wO wherein x, y, z, and w satisfy the relations, $0.2 \leq x \leq 0.45$, $0.1 \leq y \leq 0.2$, $0.35 \leq z \leq 0.6$, and $0.03 \leq w \leq 0.13$, respectively, (x+y+z+w=1).

The solid electrolyte film may be heated during or after deposition. In the above-described production method, an X-ray diffraction pattern of the solid electrolyte film has peaks at 2θ of about 11° and 30° with a half width of 10° or less.

A solid electrolyte film may be heated for measuring the temperature characteristics of ionic conductivity. However, this heating is basically different from the heating in the present invention for the following reasons: Unlike in the structure of a lithium battery, in the structure of a sample for measuring the temperature characteristics, a solid electrolyte film is formed on an insulating substrate such as a glass substrate or the like. Therefore, an object to be heated is different from that of the lithium battery. There is also a wide variety of solid electrolyte films including a crystalline film, an amorphous film, and a film intermediate between crystalline and amorphous films, and whether or not a solid electrolyte film is influenced by heating is not known unless it is measured. In addition, the time of heating for measuring the temperature characteristics is shorter than that in the present invention.

As described above, the present invention can provide a lithium secondary battery having a high energy density, excellent stability of charge-discharge cycle properties, and high safety without causing a short circuit due to the occurrence of dendrite from a lithium metal film anode.

BRIEF DESCRIPTION OF THE DRAWING

FIGURE is an X-ray diffraction pattern of a solid electrolyte film formed on a glass substrate according to an embodiment of the present invention.

DETAILED DESCRIPTION OF THE INVENTION

The control of the composition of a solid electrolyte film, a lithium metal film, and an oxygen content was examined as described in Examples 1, 2, and 3 below. As a result, it was confirmed that in any case, an excellent lithium secondary battery anode can be obtained.

Example 1

A secondary battery anode member including a solid electrolyte film having a lithium (Li)-phosphorus (P)-sulfur (S)-oxygen (O) composition was prepared according to the following procedures: First, a rolled copper foil of 10 μm in thickness, 100 mm in length, and 50 mm in width was prepared. The copper foil substrate was fixed on a substrate support in a vacuum evaporation apparatus, and a lithium metal piece used as a raw material was placed in a heating vessel. The pressure was controlled to $1 \times 10^{-5}$ Pa, and a lithium metal film was formed on the copper foil substrate by vacuum evaporation. As a result of measurement by a stylus-type step measuring device, the thickness of the lithium metal film was 5 μm. The rolled copper foil having the lithium metal film was installed at a predetermined position in a solid electrolyte film deposition apparatus. Similarly, a glass substrate was installed in the deposition apparatus to prepare a solid electrolyte film for evaluating performance.

Next, powders of lithium sulfide ($Li_2S$), phosphorus pentasulfide ($P_2S_5$), and phosphorus pentoxide ($P_2O_5$) were prepared and sufficiently mixed, and the resulting mixture was placed in a mold and pressurized to form a pellet-shaped target. Since each of the powders was rich in activity, the above-described process was performed in a glove box filled with argon gas with a dew point of −80° C. Next, the target was transferred from the glove box to a predetermined position in the solid electrolyte film deposition apparatus so as not to be exposed to air using a special vessel.

After the solid electrolyte film deposition apparatus was evacuated, the surfaces of the lithium metal film and the glass substrate were cleaned by ion bombardment with argon gas. Next, the pressure in the solid electrolyte film deposition apparatus was set to $1 \times 10^{-2}$ Pa using a dry argon atmosphere having a dew point of −80° C. Then, a laser beam was concentrated on the target to evaporate the target and form a solid electrolyte film on the surface of each of the lithium metal film and the glass substrate by a laser ablation method so that the intended thickness of 0.5 μm was obtained. After the deposition, heating was performed at a temperature of 170° C. for 5 minutes. Each of the resulting two types of samples was placed in a predetermined transparent vessel closed with argon gas and observed. As a result, the solid electrolyte film on the lithium metal film was colorless and transparent, and the color of the sample became the same as that of the lithium metal used as the underlying film.

The compositions of the solid electrolyte films on the copper foil and the glass substrate were analyzed by X-ray photoelectron spectroscopic (XPS) analysis (ESCA5400MC manufactured by PHI Inc.). In this analysis, each sample was transferred to the XPS apparatus so as not to be exposed to air using a predetermined vessel. As a result, each solid electrolyte film had the composition: Li; 26 atomic %, P; 13 atomic %, S; 54 atomic %, and O; 7 atomic %.

In a composition profile in the depth direction, the Li content increased with increases in the depth beyond the position of the solid electrolyte film, and the other element contents decreased. After P and S were not detected, the O content was 2 atomic %. Namely, the oxygen content of the lithium metal film was 2 atomic %. After the preparation of the samples, the samples were stored in dry argon gas to measure the time stability by an acceleration experiment. Even after a time corresponding to 3 years had elapsed from the preparation, the transparency of the solid electrolyte film did not change, and the color of the sample also did not change. The XPS analysis of the composition of the solid electrolyte film showed no change as compared with that immediately after the preparation.

Furthermore, the properties of the solid electrolyte film on the glass substrate were examined. The solid electrolyte film was cut together with the glass substrate, and a section was observed with a scanning electron microscope (SEM) to measure the thickness. The average thickness of the solid electrolyte film was the intended value of about 0.5 μm. In addition, a gold comb electrode was formed on the solid electrolyte film formed on the glass substrate to measure the ionic conductivity of the solid electrolyte film by a complex impedance method. As a result, the ionic conductivity at 25° C. was $5.3 \times 10^{-4}$ S/cm, and the activation energy was 35 kJ/mol. It was thus found that the solid electrolyte film has sufficiently high performance as an anode member.

The solid electrolyte film formed on the glass substrate was measured by a thin film method using an X-ray diffractometer manufactured by Rigaku Corporation and Cu Kα radiation as an X-ray source to obtain the X-ray diffraction pattern shown in FIGURE. Since the substrate was an amorphous glass substrate, the X-ray diffraction pattern only of the solid electrolyte film was obtained, in which two peaks were observed at 2θ of 11° with a half width of 3° and 2θ of 30° with a half width of 5°.

The method for determining a half width will be described with reference to diffraction peak 1 at 30° shown in FIGURE. First, the background 2 is determined because the intensity of the background is inclined. A perpendicular was dropped from the top 3 of the peak to the abscissa of the diffraction pattern, and the intersection of the perpendicular and the background 2 is determined as a zero point 4. An additional line 6 parallel to the background 2 is drawn to pass through an intermediate point 5 between the zero point 4 and the top 3 of the peak. Next, the intersections 7A and 7B of the diffraction peak 1 and the additional line 6 are determined, and a difference of 2θ between the intersections 7A and 7B is determined as a half width.

The characteristics of the solid electrolyte film on the glass substrate were the same as those of the solid electrolyte film on the lithium metal film. Therefore, the metal lithium and the solid electrolyte film formed on the copper foil in this example can exhibit excellent performance as a lithium secondary battery anode material.

Example 2

A lithium metal film was formed on the same copper foil as that used in Example 1. The copper foil substrate was fixed on a substrate support in a vacuum evaporation apparatus. A lithium metal piece used as a raw material was placed in a heating vessel, and the vapor deposition apparatus was evacuated to form a lithium metal film on the copper foil by vacuum evaporation.

The oxygen content of the resultant lithium film was analyzed in the depth direction using ESCA5400MC manufactured by PHI Inc. As a result, the oxygen content at the surface was 52 atomic %, but the oxygen content at a depth of 0.46 μm was 5 atomic %. The oxygen at the surface was due to oxidation in the step of handling the sample. The rolled copper foil having the lithium metal film was placed at a predetermined position in the deposition apparatus. Then, the lithium metal was removed by ion bombardment to a depth of about 0.5 μm at which the oxygen content of the lithium metal was 5 atomic %. Then, a solid electrolyte film was deposited by the same method as in Example 1 and then heated at a temperature of 100° C. for 5 hours.

The solid electrolyte film on the lithium metal film was measured as in Example 1. As a result, the solid electrolyte film on the lithium metal film was colorless and transparent, and the color of the sample became the same as that of the lithium metal used as the base. The solid electrolyte film had the composition: Li; 26 atomic %, P; 13 atomic %, S; 54 atomic %, and O; 7 atomic %. In an X-ray diffraction pattern measured by a thin film method using Cu Kα radiation, the peaks observed at 2θ of about 11° and about 30° each had a half width of 10° or less.

After the preparation of the sample, the sample was stored in dry argon gas to measure the time stability by an acceleration experiment. Even after a time corresponding to 3 years had elapsed from the preparation, the transparency of the solid electrolyte film did not change, and the color of the sample also did not change. The XPS analysis of the composition of the solid electrolyte film showed no change as compared with that immediately after the preparation.

Example 3

A secondary battery anode member was prepared by the same method as in Example 1 except the heating temperature of an anode material after deposition of a solid electrolyte film and the composition of the solid electrolyte film. First, a rolled copper foil of 10 μm in thickness, 100 mm in length, and 50 mm in width was prepared as a substrate, and a lithium metal film was formed on the copper foil by a vacuum evaporation apparatus. As a result of measurement by a stylus-type step measuring device, the thickness of the lithium metal film was 5 μm. Furthermore, a solid electrolyte film having a lithium (Li)-phosphorus (P)-sulfur (S)-oxygen (O) composition was deposited to a thickness of 0.5 μm on the lithium metal film by a laser ablation method using a target having a composition different from that in Example 1.

After the deposition, heating was performed in the deposition apparatus at a temperature of 75° C. for 50 hours. As a result, the solid electrolyte film was colorless and transparent, and the color of the sample became the same as that of the lithium metal used as the base. A series of these steps was performed in a dry argon gas atmosphere having a dew point of −80°. Then, the sample was transferred into an analyzer so as not to be exposed to air using a predetermined vessel. The composition of the solid electrolyte film was analyzed by X-ray photoelectron spectroscopic (XPS) analysis using ESCA5400MC manufactured by PHI Inc. Consequently, the solid electrolyte film had the composition: Li; 26 atomic %, P; 13 atomic %, S; 57 atomic %, and O; 4 atomic %.

In an X-ray diffraction pattern measured by a thin film method using Cu Kα radiation, broad peaks were observed at 2θ of 11° with a half width of 7° and 2θ of 30° with a half width of 10°. After the preparation of the sample, the sample was stored in dry argon gas to measure the time stability. Even after a time corresponding to 3 years had elapsed from the preparation, the transparency of the solid electrolyte film did not change, and the color of the sample also did not change. The XPS analysis of the composition of the solid electrolyte film showed no change as compared with that immediately after the preparation.

Comparative Example 1

A lithium metal film was formed by vapor deposition on a rolled copper foil of 10 μm in thickness used as a substrate. As a result of measurement of the thickness by a stylus-type step measuring device, the thickness of the lithium metal film was 5 μm. Furthermore, a solid electrolyte film having a lithium (Li)-phosphorus (P)-sulfur (S)-oxygen (O) composition was deposited, by a laser ablation method, to a thickness of 0.5 μm on the lithium metal film formed on the substrate. After the deposition, heating was not performed. As a result, the solid electrolyte film was colorless and transparent, and the color of the sample became the color of the lithium metal used as the base. A series of these production steps was performed in a dry argon gas atmosphere.

The composition of the solid electrolyte film was analyzed by X-ray photoelectron spectroscopic (XPS) analysis. As an analyzer, ESCA5400MC manufactured by PHI Inc. was used, and the sample was installed in the analyzer so as not to be exposed to air using a predetermined vessel. The solid electrolyte film immediately after the deposition had the composition: Li; 26 atomic %, P; 13 atomic %, S; 57 atomic %, and O; 4 atomic %. As a result of thin film X-ray diffraction measurement, very broad peaks were observed at 11° and 30° as centers with a half width of about 20°. Therefore, it was decided that the solid electrolyte film was close to an amorphous film.

After the preparation of the sample, the sample was stored in dry argon gas to measure the time stability. After a time corresponding to 3 years had elapsed from the preparation, the allover transparency of the solid electrolyte film did not change, but a blackened portion was observed. The XPS analysis of the composition of the blackened portion showed that the ratio of lithium is significantly increased, and thus the blackened portion is formed by reduction with the underlying lithium metal.

The lithium secondary battery anode member obtained in the present invention can be used for a coiled cell and a wound battery. A lithium secondary battery using the anode of the present invention has a long life without deterioration and can thus contribute to making an electronic device cordless and decreasing the size thereof.

What is claimed is:

1. A method for producing a lithium secondary battery anode member including a laminate of a lithium metal film and a solid electrolyte film on a substrate, wherein the solid electrolyte film has a crystallinity between amorphous and crystalline states and an X-ray diffraction pattern of the solid electrolyte film has peaks at 2θ of about 11° and 30° with a half width of 10° or less, the method comprising steps of:

depositing the lithium metal film on the substrate;

depositing the solid electrolyte film on the lithium metal film by using a mixture of powders of lithium sulfide ($Li_2S$), phosphorus pentasulfide ($P_2S_5$) and phosphorus pentoxide ($P_2O_5$); and heating the solid electrolyte film at 75° C. to 170° C. for 5 minutes to 50 hours in a dry inert atmosphere, wherein the composition of the solid electrolyte film is $xLi.yP.zS.wO$ wherein x, y, z, and w satisfy the relations, $0.2 \leq x \leq 0.45$, $0.1 \leq y \leq 0.2$, $0.35 \leq z \leq 0.6$, and $0.03 \leq w \leq 0.13$, respectively, ($x+y+z+w=1$).

2. A method according to claim 1, wherein the lithium metal film contains 1 atomic % to 10 atomic % of oxygen.

* * * * *